(12) United States Patent
Shi et al.

(10) Patent No.: US 11,794,280 B2
(45) Date of Patent: Oct. 24, 2023

(54) COMPONENT WITH TAILORED MECHANICAL AND CORROSION PROPERTIES

(71) Applicant: GM GLOBAL TECHNOLOGY OPERATIONS LLC, Detroit, MI (US)

(72) Inventors: Mingfeng Shi, Warren, MI (US); Sarah Tedesco, Warren, MI (US); Qi Lu, Shanghai (CN); Jason J. Coryell, Warren, MI (US); Jianfeng Wang, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/725,813

(22) Filed: Apr. 21, 2022

(65) Prior Publication Data

US 2023/0111725 A1    Apr. 13, 2023

(30) Foreign Application Priority Data

Oct. 12, 2021    (CN) .......................... 202111188182.6

(51) Int. Cl.
*C22C 38/46* (2006.01)
*C22C 38/44* (2006.01)
(Continued)

(52) U.S. Cl.
CPC ............ *B23K 26/26* (2013.01); *B21D 22/022* (2013.01); *C21D 6/004* (2013.01); *C21D 6/005* (2013.01);
(Continued)

(58) Field of Classification Search
CPC ......... C22C 38/02; C22C 38/04; C22C 38/42; C22C 38/44; C22C 38/46; C22C 38/48; C21D 2211/001
(Continued)

(56) References Cited

U.S. PATENT DOCUMENTS 11,255,006 B2    2/2022    Lu et al.
11,415,040 B1    8/2022    Smith et al.
(Continued)

FOREIGN PATENT DOCUMENTS

WO    WO-2019222950 A1    11/2019

OTHER PUBLICATIONS

Finus, "How does laser welding work? Costs, advantages & disadvantages", Aug. 24, 2019, URL: <https://www.maschinenmarkt.international/how-does-laser-welding-work-costs-advantages-disadvantages-a-857309/>, pp. 1-12 (Year: 2019).*

*Primary Examiner* — Adam Krupicka
*Assistant Examiner* — Katherine A Christy
(74) *Attorney, Agent, or Firm* — Harness, Dickey & Pierce, P.L.C.

(57) ABSTRACT

A hot formed joined blank includes a first metal blank having an ultimate tensile strength of ≥about 1300 MPa to ≤about 2000 MPa and defining a first surface, a second metal blank having an ultimate tensile strength of ≥about 400 MPa to ≤about 1200 MPa and defining a second coated surface having a coating disposed thereon. The coating includes aluminum and silicon or in alternative variations, zinc. A third surface of the second metal blank is joined to the first surface of the first metal blank to form the hot formed joined blank. A weld nugget is disposed along a boundary between the first and second metal blanks that is configured to join the first and second metal blanks, where the weld nugget optionally includes less than or equal to about 1.5 weight percent aluminum or a microstructure comprising austenite and delta-ferrite.

11 Claims, 7 Drawing Sheets

(51) Int. Cl.

| | |
|---|---|
| *C22C 38/42* | (2006.01) |
| *C22C 38/02* | (2006.01) |
| *C22C 38/04* | (2006.01) |
| *B23K 26/26* | (2014.01) |
| *C21D 9/50* | (2006.01) |
| *C22C 38/48* | (2006.01) |
| *C21D 6/00* | (2006.01) |
| *B21D 22/02* | (2006.01) |

(52) U.S. Cl.
CPC ............... *C21D 6/008* (2013.01); *C21D 9/50* (2013.01); *C22C 38/02* (2013.01); *C22C 38/04* (2013.01); *C22C 38/42* (2013.01); *C22C 38/44* (2013.01); *C22C 38/46* (2013.01); *C22C 38/48* (2013.01); *C21D 2211/001* (2013.01)

(58) Field of Classification Search
USPC ............................................................ 420/8
See application file for complete search history.

(56) References Cited

U.S. PATENT DOCUMENTS

| | | |
|---|---|---|
| 2018/0202017 A1* | 7/2018 | Drillet .................... C21D 6/005 |
| 2018/0223385 A1 | 8/2018 | Lu et al. |
| 2020/0063232 A1 | 2/2020 | Lu et al. |
| 2020/0190611 A1* | 6/2020 | Lu ......................... C21D 8/0226 |
| 2020/0224295 A1* | 7/2020 | Becker .................... C22C 38/14 |
| 2021/0002746 A1 | 1/2021 | Lu et al. |
| 2021/0087661 A1 | 3/2021 | Lu et al. |
| 2021/0187906 A1 | 6/2021 | Lu et al. |
| 2021/0276065 A1 | 9/2021 | Pang et al. |

\* cited by examiner

COMPONENT WITH TAILORED MECHANICAL AND CORROSION PROPERTIES

CROSS-REFERENCE TO RELATED APPLICATIONS

This application claims the benefit and priority of Chinese Application No. 202111188182.6, filed Oct. 12, 2021. The entire disclosure of the above application is incorporated herein by reference.

INTRODUCTION

This section provides background information related to the present disclosure which is not necessarily prior art.

In various manufacturing processes, such as manufacturing in the automobile industry, sheet metal panels or blanks may be stamped, where the sheet metal panel is pressed between a pair of dies, to create a complex three-dimensional shaped component. A sheet metal blank is usually first cut from a coil of metal material. The sheet metal material is chosen for its desirable characteristics, such as strength, ductility, and other properties related to the metal alloy.

Different techniques have been used to reduce the weight of a vehicle, while still maintaining its structural integrity. For example, tailor-welded blanks are commonly used to join dissimilar materials with different strength, ductility and/or thickness to create a composite blank with tailored properties to fulfill specialized load requirements for a structural component after forming. For example, the B-pillar structural component of a car body, may utilize a tailor-welded blank including a high strength material in the upper portion and relatively low strength with higher ductility in the lower portion that desirably exhibits a relatively high structural rigidity in the areas corresponding to the body of the occupant, while having increased deformability in the lower region at or below the occupant's seat to facilitate buckling of the B-pillar below seat level when force or impact is applied. As the structural component has different performance requirements in different regions, such a component has been made with a composite blank with multiple distinct pieces tailor-welded together to form what is known as a "tailor welded blank," or "tailor welded coil" before forming. By way of non-limiting example, tailor welded blanks may be used to form structural components in vehicles, for example, structural pillars (such as A-pillars, B-pillars, C-pillars, and/or D-pillars), hinge pillars, vehicle doors, roofs, hoods, trunk lids, engine rails, and other components with high strength and different gauge requirements.

A tailored welded blank may thus be an assembly that typically includes at least one first metal sheet or blank and a second metal sheet or blank having at least one different characteristic from the first sheet. For example, steel blanks or steel strips having different strength, ductility, hardness, and/or thicknesses may be joined. Using a tailor-welded blank, the desired contour or three-dimensional structure is created, for example, by a cold forming process or hot forming process (e.g., like the stamping process described above). Thus, adjoining edges of the first and second sheets may be metallurgically or mechanically interlocked together, for example, by making a weld, junction, or other connection along the adjoining edges to interlock them with one another. Thereafter, the permanently affixed sheets or blanks may be processed to make a shaped or formed sheet metal assembly product. Notably, the tailor welded blank is not limited to solely two sheets or blanks in the assembly, rather three or more sheets or blanks may be joined together and shaped to form the tailor welded blank assembly.

However, creating tailor welded blanks may be relatively cost-intensive due to the numerous steps and manufacturing processes involved. For example, the initial work piece blanks need to be individually cut with a tight dimensional tolerance requirement, then joined in a welding process, followed by the forming or shaping processes. In addition, issues with the structural component may potentially arise due to the presence of a joint or junction, such as a weld line. For example, the weld line or connection between the blanks may provide a site for localized strain that may alter the properties of the structural component and/or potentially cause premature failure. Further, in subsequent hot forming processes, the effect of the heat from blank heating may cause changes in the properties in the welding seam that can ultimately lead to softening at the welding seam(s) in the finished component, which could potentially compromise the quality and functionality of such an assembly made from tailor-welded blank.

SUMMARY

This section provides a general summary of the disclosure, and is not a comprehensive disclosure of its full scope or all of its features.

In certain aspects, the present disclosure provides a hot formed joined blank including a first metal blank having an ultimate tensile strength of greater than or equal to about 1300 MPa to less than or equal to about 2000 MPa and defining a first surface, a second metal blank having an ultimate tensile strength of greater than or equal to about 400 MPa to less than or equal to about 1200 MPa and defining a second coated surface having a coating disposed thereon, wherein the coating includes aluminum and silicon, and a third surface of the second metal blank is joined to the first surface of the first metal blank to form the hot formed joined blank, and a weld nugget disposed along a boundary between the first and second metal blanks that is configured to join the first and second metal blanks, the weld nugget including less than or equal to about 1.5 weight percent aluminum.

In certain aspects, the present disclosure provides the weld nugget that includes a microstructure including less than or equal to about 10 vol. % of austenite and less than or equal to about 15 vol. % of delta-ferrite.

In certain aspects, the present disclosure provides the first metal blank having an ultimate strength of greater than or equal to about 1700 MPa and including martensite and austenite, and the second metal blank having an ultimate strength of greater than or equal to about 1000 MPa and includes martensite.

In certain aspects, the present disclosure provides the first metal blank including an alloy composition including chromium (Cr) at a concentration of greater than or equal to about 0.5 wt. % to less than or equal to about 6 wt. %, carbon (C) at a concentration of greater than or equal to about 0.15 wt. % to less than or equal to about 0.5 wt. %, manganese (Mn) at a concentration of greater than or equal to about 0 wt. % to less than or equal to about 3 wt. %, silicon (Si) at a concentration of greater than or equal to about 0.5 wt. % to less than or equal to about 2 wt. %, nitrogen (N) at a concentration of greater than or equal to about 0 wt. % to less than or equal to about 0.01 wt. %, nickel (Ni) at a concentration of greater than or equal to about 0 wt. % to less than or equal to about 5.0 wt. %, copper (Cu) at a concentration of greater than or equal to about 0 wt. % to less than or equal to about 5.0 wt. %, molybdenum (Mo) at a concentration of greater than or equal to about 0 wt. % to less than or equal to about 5.0 wt. %, vanadium (V) at a concentration of greater than or equal to about 0 wt. % to less than or equal to about 1.0 wt. %, niobium (Nb) at a concentration of greater than or equal to about 0 wt. % to less than or equal to about 0.1 wt. %, and a balance of the alloy composition being iron.

In certain aspects, the present disclosure provides the first metal blank free of a coating.

In certain aspects, the present disclosure provides that the first metal blank and the second metal blank are laser butt welded together.

In certain aspects, the present disclosure provides a hot formed joined blank including a first metal sheet having an ultimate tensile strength of greater than or equal to about 1300 MPa to less than or equal to about 2000 MPa and defining a first surface, a second metal sheet having an ultimate tensile strength of greater than or equal to about 400 MPa to less than or equal to about 1200 MPa, and defining a second surface having a coating disposed thereon, wherein the coating includes zinc, and a third surface of the second metal blank is joined to the first surface of the first metal blank, and a weld nugget disposed along a boundary between the first and second metal blanks that is configured to join the first and second metal blanks, the weld nugget includes a microstructure including austenite and delta-ferrite, wherein the austenite is less than or equal to about 10 vol. % and the delta-ferrite is less than or equal to about 15 vol. %.

In certain aspects, the present disclosure provides the first metal sheet having an ultimate strength of greater than or equal to about 1700 MPa and includes martensite and austenite, and the second metal sheet has an ultimate strength of greater than or equal to about 1000 MPa and includes martensite.

In certain aspects, the present disclosure provides the first metal sheet includes an alloy composition including chromium (Cr) at a concentration of greater than or equal to about 0.5 wt. % to less than or equal to about 6 wt. %, carbon (C) at a concentration of greater than or equal to about 0.15 wt. % to less than or equal to about 0.5 wt. %, manganese (Mn) at a concentration of greater than or equal to about 0 wt. % to less than or equal to about 3 wt. %, silicon (Si) at a concentration of greater than or equal to about 0.5 wt. % to less than or equal to about 2 wt. %, nitrogen (N) at a concentration of greater than or equal to about 0 wt. % to less than or equal to about 0.01 wt. %, nickel (Ni) at a concentration of greater than or equal to about 0 wt. % to less than or equal to about 5.0 wt. %, copper (Cu) at a concentration of greater than or equal to about 0 wt. % to less than or equal to about 5.0 wt. %, molybdenum (Mo) at a concentration of greater than or equal to about 0 wt. % to less than or equal to about 5.0 wt. %, vanadium (V) at a concentration of greater than or equal to about 0 wt. % to less than or equal to about 1.0 wt. %, niobium (Nb) at a concentration of greater than or equal to about 0 wt. % to less than or equal to about 0.1 wt. %, and a balance of the alloy composition being iron.

In certain aspects, the present disclosure provides that the first metal sheet is free of a coating.

In certain aspects, the present disclosure provides a method of forming an assembly of steel parts, the method including, welding a first end face of a first blank to a second end face of a second blank to form a blank assembly, the first blank being free of any coating, and forming a weld nugget along an interface of the first end face and the second end face, and hot forming the blank assembly so as to form austenite, wherein the weld nugget includes austenite, the vol. % of austenite being less than or equal to about 10 vol. %.

In certain aspects, the present disclosure provides the method may further include cutting a first blank from the first metal coil, and cutting a second blank from the second metal coil In certain aspects, the present disclosure provides that the joining is laser welding performed in an inert environment including argon (Ar) or nitrogen ($N_2$) or combinations thereof.

In certain aspects, the present disclosure provides the method may further include stamping the blank assembly into a formed press-hardened steel component.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

As used herein, all amounts are weight % (or mass %), unless otherwise indicated, for example volume (vol.) %.

In addition, disclosure of ranges includes disclosure of all values and further divided ranges within the entire range, including endpoints and sub-ranges given for the ranges.

Example embodiments will now be described more fully with reference to the accompanying drawings.

Structural assemblies may be used in vehicles to provide structural support and/or mounting locations for other vehicle components. Structural assemblies may include energy-absorbing components that absorb collision energy through controlled deformation. Structural assemblies may be constructed from metal, such as aluminum or steel, and/or polymer composite material components. Metal structural assemblies may absorb energy when elastically and/or plastically deforming without fracture. Lower strength metals may be assembled to additional reinforcement components to achieve a desired strength. Some structural assemblies utilize cross member components to achieve a desired energy absorbing performance, such as in side impact collisions.

The components formed in accordance with certain aspects of the present disclosure are particularly suitable for use in various components of an automobile or other vehicles (e.g., motorcycles, boats, tractors, buses, motorcycles, mobile homes, campers, and tanks), but they may also be used in a variety of other industries and applications, including aerospace components, consumer goods, devices, buildings (e.g., houses, offices, sheds, warehouses), office equipment and furniture, and industrial equipment machinery, agricultural or farm equipment, or heavy machinery, by way of non-limiting example. Non-limiting examples of automotive components include hoods, pillars (e.g., A-pillars, hinge pillars, B-pillars, C-pillars, and the like), panels, including structural panels, door panels, and door components, interior floors, floor pans, roofs, exterior surfaces, underbody shields, wheels, control arms and other suspension, crush cans, bumpers, structural rails and frames, cross car beams, undercarriage or drive train components, and the like.

Some structural assemblies may be complex to assemble because of a large quantity of components and/or a multi-step process to combine the components. Due to the quantity and/or complexity of distinct components, manufacturing and assembling a structural assembly may be intricate, complex, and/or time consuming.

In various aspects, the present disclosure provides a component that may be used in a tailor welded blank and/or a tailor welded assembly for a vehicle. The component may include a plurality of high-strength metal components, such as high-strength steel. The structural assembly includes a plurality of high strength panels welded, or joined to each other. The component includes a first metal sheet or component fixed to a second metal sheet or component (e.g. by welding). The second metal sheet may further include a coating, and the first metal sheet may be free of any added coating free (e.g., no coating is applied aside from formation of native oxides and the like) metal sheet.

Laser butt welding is a metal joining process in which a laser beam is directed between metal workpieces to provide a concentrated energy source capable of effectuating a weld joint between the two adjacent constituent metal workpieces with well controlled gap. In general, two metal workpieces are first aligned relative to one another along the weld edges with a controlled gap. A laser beam is then directed towards the gap and the heat generated from the absorption of energy from the laser beam initiates melting of the metal workpieces at edges and creates a molten weld pool between the workpieces.

The laser beam creates the molten weld pool in a short duration by impinging the edges of the workpieces. Once created, the molten weld pool grows as the laser beam continues to deliver energy to the workpiece and a weld line is generated when laser beam travels along the edges of workpieces. The general shape and penetration depth of the molten weld pool can be managed by controlling various characteristics of the laser beam including its power and focal position as well as the gap between workpieces. When the molten weld pool has stabilized and reached the desired penetration depth in the workpiece, the transmission of the laser beam is ceased so that it no longer impinges the base materials at the weld site and/or travels along the weld joint. The molten weld pool quickly cools and solidifies to form a laser weld joint comprised of resolidified composite workpiece material derived from each of the workpieces (and any coatings) penetrated by molten weld pool. The resolidified composite workpiece material of the weld joint autogenously fusion welds the adjacent workpieces together at the weld joint site.

Laser welding to manufacture a composite (e.g., tailored) blank is of interest in various industries including the automotive industry where the corresponding formed parts can be installed on a vehicle. In one example, a vehicle pillar may be fabricated from a lower blank configured to withstand corrosion and protect passengers in a specific manner and an upper blank configured to protect passengers in a different, specific manner, wherein the lower blank and upper blank are joined together by a plurality of laser welds prior to forming or shaping in a die. The upper and lower panels are first placed adjacent one another along the boundaries or edges to be welded and secured in place by clamps. A laser beam is then sequentially directed at a weld line defined between the adjacent blanks in accordance with a programmed sequence to form the plurality of laser weld joints as previously described. The process of laser welding upper and lower blank portions (as well as other vehicle part components such as those used to fabricate hoods, deck lids, body structures such as body sides and cross-members, load-bearing structural members, etc.) is typically an automated process that can be carried out quickly and efficiently. The aforementioned desire to laser weld metal workpieces is not unique to the automotive industry; indeed, it extends to other industries that may utilize laser welding as a joining process including the aviation, maritime, railway, and building construction industries, by way of non-limiting example.

By way of background, the use of laser welding to join coated metal workpieces together that are often used in manufacturing practices can present challenges. For example, steel workpieces often include a thin zinc-based surface coating for corrosion protection. Zinc has a boiling point of about 906° C., while the melting point of the base steel substrate it coats is typically greater than 1300° C. Thus, when a steel workpiece that includes an outer zinc-based coating is laser welded, high-pressure zinc vapors are readily produced at the surfaces of the steel workpiece and have a tendency to disrupt the laser welding process.

To deter high-pressure zinc vapors from diffusing into the molten weld pool, conventional manufacturing procedures have called for laser ablation or mechanical removal of at least one of the two workpieces at one or both workpieces where a zinc-based coating is present before laser welding is conducted. The laser ablation or mechanical removal processes may remove the zinc coating of one or more steel workpieces that are processed in such a way. Consequently, when the processed steel workpiece is placed within the workpiece alignment, there is substantially no zinc at the weld site. But the removal of the coating adds an additional step to the overall laser welding process and is believed to contribute to the occurrence of substandard weld joints.

Steel workpieces that are used in manufacturing practices may also include other types of surface coatings for performance-related reasons besides those that include zinc. Other notable surface coatings include aluminum-based coatings such as aluminum, an aluminum-silicon alloy, or an aluminum-magnesium alloy, to name but a few additional examples. Unlike zinc, these surface coatings do not boil at a temperature below the melting point of steel, so they are unlikely to produce high-pressure vapors. Notwithstanding this fact, these surface coatings can be melted and captured by the molten weld pool at the weld site. The introduction of such disparate molten materials into the molten weld pool can lead to a variety of weld defects that have the potential to degrade the mechanical properties of the laser weld joint. Molten aluminum or aluminum alloys (e.g., AlSi or AlMg alloys), for instance, can dilute the steel content of the molten weld pool and form detrimental Al enriched delta ferrite within the weld joint as well as negatively affect the cooling behavior of the molten weld pool. After hot forming process, the delta ferrite will still exist and can be detrimental to the mechanical performance. For example, when laser welding a steel form with a coating comprising aluminum and silicon coating, the weld nugget may have greater than or equal to exactly or about 1% by weight to less than or equal to exactly or about 3% by weight of aluminum. It is thus desirable if two or more steel workpieces—at least one of which includes a surface coating (i.e., is not considered to be a "bare" steel)—could be laser welded together in a way that mitigates the likelihood that weld defects derived from the surface coating(s) will accumulate within the laser weld joint and negatively affect its strength.

The present disclosure pertains to assemblies of components formed of high-strength steel alloys and methods of forming high-strength components from high-strength steel alloys. A high-strength steel is one that has an ultimate tensile strength of greater than or equal to exactly or about 1,000 megapascals (MPa), for example, greater than or equal to exactly or about 1,400 MPa to less than or equal to exactly or about 2,200 MPa. In various embodiments, a high-strength steel alloy may be joined with a steel that may or may not be a high-strength steel alloy.

FIG. 1A-1D are perspective views of a tailor welded blank assembly or component 10 formed according to various aspects of the present disclosure. The component 10 may include a first metal sheet 12 and a second metal sheet 13, the second metal sheet 13 including a coating 14. The component 10 may further include a nugget 15 (e.g., a weld nugget) at the junction of the first and second metal sheets 12 and 13. As will be described in greater detail below in FIGS. 1A-1B, the first metal sheet 12 may be joined to the second metal sheet 13.

Figure 1A:
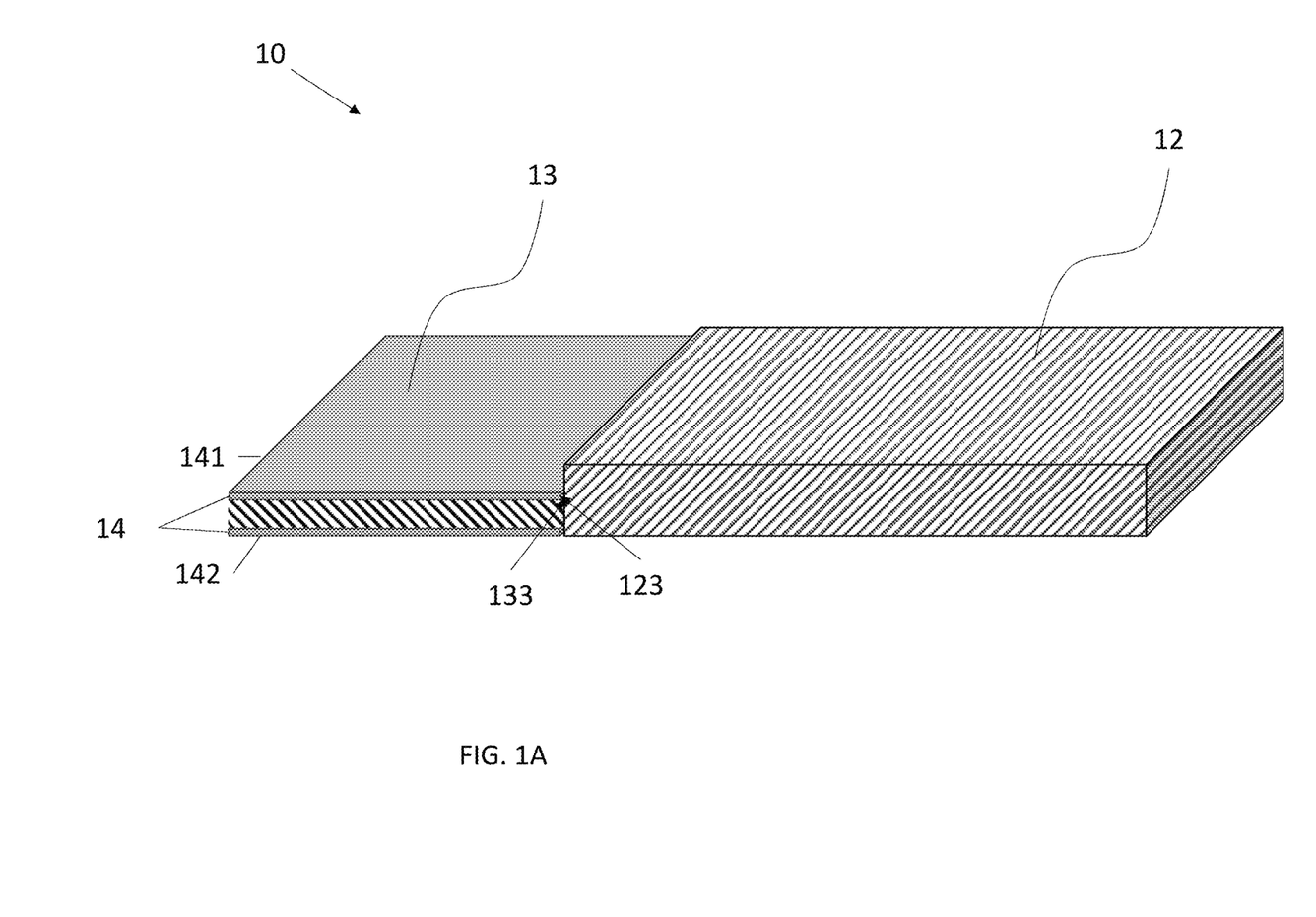
FIG. 1A-1D are perspective views of a tailor welded blank according to various aspects of the present disclosure.

In various embodiments, the first metal sheet 12 may be the alloy composition as in Table 1, although the disclosure of the inventive concepts is not limited thereto. In various embodiments, the alloy composition of Table 1 may be used to form a press hardened steel component with an ultimate tensile strength of greater than or equal to exactly or about 1300 MPa to less than or equal to exactly or about 2000 MPa.

TABLE 1

An alloy composition of the first metal sheet 12 according to some example embodiments.

| Grade | Coating | Chemical Composition (wt. %) | | | |
|---|---|---|---|---|---|
| | | C | Mn | Cr | Si |
| Coating free PHS | Free | 0.1-0.40 | 0-3.0 | 0.5-6 | 0.5-2 |

The alloy composition of the first metal sheet 12 may comprise silicon (Si) at a concentration of greater than or equal to exactly or about 0.5 wt. % to less than or equal to exactly or about 2 wt. %, greater than or equal to exactly or about 0.6 wt. % to less than or equal to exactly or about 1.8 wt. %, or greater than or equal to exactly or about 0.8 wt. % to less than or equal to exactly or about 1.5 wt. %. For example, in various embodiments the alloy composition of the first metal sheet 12 may comprise Si at a concentration of exactly or about 0.5 wt. %, exactly or about 0.6 wt. %, exactly or about 0.7 wt. %, exactly or about 0.8 wt. %, exactly or about 0.9 wt. %, exactly or about 1 wt. %, exactly or about 1.1 wt. %, exactly or about 1.2 wt. %, exactly or about 1.3 wt. %, exactly or about 1.4 wt. %, exactly or about 1.5 wt. %, exactly or about 1.6 wt. %, exactly or about 1.7 wt. %, exactly or about 1.8 wt. %, exactly or about 1.9 wt. %, or exactly or about 2 wt. %. This high amount of Si in the alloy composition improves oxidation resistance, permits a lower amount of chromium to be added while still not requiring coating or shot blasting after forming, and prevents, inhibits, or decreases cementite formation during a quench and partitioning process.

The alloy composition of the first metal sheet 12 may also comprise chromium (Cr). The alloy composition of the first metal sheet 12 may comprise Cr at a concentration of greater than or equal to exactly or about 0.5 wt. % to less than or equal to exactly or about 6 wt. %, greater than or equal to exactly or about 1.5 wt. % to less than or equal to exactly or about 5 wt. %, greater than or equal to exactly or about 1.75 wt. % to less than or equal to exactly or about 4 wt. %, greater than or equal to exactly or about 2 wt. % to less than or equal to exactly or about 3 wt. %, or greater than or equal to exactly or about 2 wt. % to less than or equal to exactly or about 2.5 wt. %. For example, in various embodiments the alloy composition of the first metal sheet 12 may comprise Cr at a concentration of exactly or about 0.5 wt. %, exactly or about 1 wt. %, exactly or about 1.5 wt. %, exactly or about 2 wt. %, exactly or about 2.5 wt. %, exactly or about 3 wt. %, exactly or about 3.5 wt. %, exactly or about 4 wt. %, exactly or about 4.5 wt. %, exactly or about 5 wt. %, exactly or about 5.5 wt. %, or exactly or about 6 wt. %.

The alloy composition of the first metal sheet 12 may also comprise carbon (C) at a concentration of greater than or equal to exactly or about 0.01 wt. % to less than or equal to exactly or about 0.4 wt. %, greater than or equal to exactly or about 0.01 wt. % to less than or equal to exactly or about 0.35 wt. %, greater than or equal to exactly or about 0.10 wt. % to less than or equal to exactly or about 0.4 wt. %, greater than or equal to exactly or about 0.15 wt. % to less than or equal to exactly or about 0.3 wt. %, greater than or equal to exactly or about 0.15 wt. % to less than or equal to exactly or about 0.25 wt. %, or greater than or equal to exactly or about 0.15 wt. % to less than or equal to exactly or about 0.2 wt. %. For example, in various embodiments the alloy composition of the first metal sheet 12 may comprise C at a concentration of exactly or about 0.01 wt. %, exactly or about 0.05 wt. %, exactly or about 0.1 wt. %, exactly or about 0.2 wt. %, exactly or about 0.3 wt. %, exactly or about 0.35 wt. %, or exactly or about 0.4 wt. %.

The alloy composition of the first metal sheet 12 may include manganese (Mn) at a concentration of greater than or equal to exactly or about 0 wt. % to less than or equal to exactly or about 3 wt. %, greater than or equal to exactly or about 0.25 wt. % to less than or equal to exactly or about 2.5 wt. %, greater than or equal to exactly or about 0.5 wt. % to less than or equal to exactly or about 2 wt. %, greater than or equal to exactly or about 0.75 wt. % to less than or equal to exactly or about 1.5 wt. %, or greater than or equal to exactly or about 1 wt. % to less than or equal to exactly or about 1.5 wt. %. In some example embodiments, the alloy composition of the first metal sheet 12 is substantially free of Mn. As used herein, "substantially free" refers to trace component levels, such as levels of less than or equal to exactly or about 1.5%, less than or equal to exactly or about 1%, less than or equal to exactly or about 0.5%, or levels that are not detectable. In various embodiments, the alloy composition of the first metal sheet 12 is substantially free of Mn or comprises Mn at a concentration of less than or equal to exactly or about 0.5 wt. %, less than or equal to exactly or about 1 wt. %, less than or equal to exactly or about 1.5 wt. %, less than or equal to exactly or about 2 wt. %, less than or equal to exactly or about 2.5 wt. %, or less than or equal to exactly or about 3 wt. %. A balance of the alloy composition of the first metal sheet 12 is iron. However, the inventive concepts are not limited to the above compositions, for example, other metals may be included, for example, nitrogen, nickel, copper, molybdenum, vanadium, niobium and the like. For example, the alloy composition of the first metal sheet 12 may further include at least one of nitrogen (N) at a concentration of greater than or equal to exactly or about 0 wt. % to less than or equal to exactly or about 0.01 wt. %, nickel (Ni) at a concentration of greater than or equal to exactly or about 0 wt. % to less than or equal to exactly or about 5.0 wt. %, copper (Cu) at a concentration of greater than or equal to exactly or about 0 wt. % to less than or equal to exactly or about 5.0 wt. %, molybdenum (Mo) at a concentration of greater than or equal to exactly or about 0 wt. % to less than or equal to exactly or about 5.0 wt. %, vanadium (V) at a concentration of greater than or equal to exactly or about 0 wt. % to less than or equal to exactly or about 1.0 wt. %, niobium (Nb) at a concentration of greater than or equal to exactly or about 0 wt. % to less than or equal to exactly or about 0.1 wt. %, or a combination thereof.

In one embodiment, the alloy composition consists essentially of Si, Cr, C, Mn, Fe, and any impurities cumulatively present at less than or equal to or about 0.5 weight %. In certain variations, it will be understood that cumulative impurity levels may instead be less than or equal to or about 0.4 wt. %, optionally less than or equal to or about 0.3 wt. %, optionally less than or equal to or about 0.2 wt. %, and optionally less than or equal to or about 0.1 wt. %. In another embodiment, the alloy composition consists of Si, Cr, C, Mn, Fe, and any impurities cumulatively present at less than or equal to about 0.5 weight %.

In one embodiment, the alloy composition consists essentially of Si, Cr, C, Mn, Al, Fe, and any impurities cumulatively present at less than or equal to about 0.5 weight %. In another embodiment, the alloy composition consists of Si, Cr, C, Mn, Al, Fe, and any impurities cumulatively present at less than or equal to about 0.5 weight %.

In one embodiment, the alloy composition consists essentially of Si, Cr, C, Mn, Al, Mo, Fe, and any impurities cumulatively present at less than or equal to about 0.5 weight %. In another embodiment, the alloy composition consists of Si, Cr, C, Mn, Al, Mo, Fe, and any impurities cumulatively present at less than or equal to about 0.5 weight %.

In one embodiment, the alloy composition consists essentially of Si, Cr, C, Mn, Al, Mo, Nb, V, Fe, and any impurities cumulatively present at less than or equal to about 0.5 weight %. In another embodiment, the alloy composition consists of Si, Cr, C, Mn, Al, Mo, Nb, V, Fe, and any impurities cumulatively present at less than or equal to about 0.5 weight %.

In one embodiment, the alloy composition consists essentially of Si, Cr, C, Mn, Al, Mo, Ni, Nb, V, Fe, and any impurities cumulatively present at less than or equal to about 0.5 weight %. In another embodiment, the alloy composition consists of Si, Cr, C, Mn, Al, Mo, Ni, Nb, V, Fe, and any impurities cumulatively present at less than or equal to about 0.5 weight %.

In one embodiment, the alloy composition consists essentially of Si, Cr, C, Mn, N, Ni, Fe, and any impurities cumulatively present at less than or equal to about 0.5 weight %. In another embodiment, the alloy composition consists of Si, Cr, C, Mn, N, Ni, Fe, and any impurities cumulatively present at less than or equal to about 0.5 weight %.

In one embodiment, the alloy composition consists essentially of Si, Cr, C, Mn, Al, N, Mo, Ni, B, Nb, V, Fe, and any impurities cumulatively present at less than or equal to about 0.5 weight %. In another embodiment, the alloy composition consists of Si, Cr, C, Mn, Al, N, Mo, Ni, B, Nb, V, Fe, and any impurities cumulatively present at less than or equal to about 0.5 weight %.

In one embodiment, the alloy composition consists essentially of Si, Cr, C, Fe, and any impurities cumulatively present at less than or equal to about 0.5 weight %. In another embodiment, the alloy composition consists of Si, Cr, C, Fe, and any impurities cumulatively present at less than or equal to about 0.5 weight %.

In one embodiment, the alloy composition consists essentially of Si, Cr, C, Mo, B, Nb, V, Fe, and any impurities cumulatively present at less than or equal to about 0.5 weight %. In another embodiment, the alloy composition consists of Si, Cr, C, Mo, B, Nb, V, Fe, and any impurities cumulatively present at less than or equal to about 0.5 weight %.

In various embodiments, the second metal sheet 13 may be the alloy composition as in Table 2, although the disclosure of the inventive concepts is not limited thereto. In various embodiments, the alloy composition of Table 2 may be used to form a press hardened steel component with an ultimate tensile strength of greater than or equal to exactly or exactly or about 400 MPa to less than or equal to exactly or about 1200 MPa.

TABLE 2

An alloy composition of the second metal sheet 13 according to some example embodiments.

Chemical Composition (wt. %)

| C | Mn | Si | B | Nb + V + Ti |
|---|---|---|---|---|
| 0.01-0.15 | 0.2-3.0 | 0.01-0.8 | 0.0008-0.005 | 0.01-0.1 |

The alloy composition of the second metal sheet 13 may comprise silicon (Si) at a concentration of greater than or equal to exactly or about 0.01 wt. % to less than or equal to exactly or about 0.8 wt. %, greater than or equal to exactly or about 0.1 wt. % to less than or equal to exactly or about 0.7 wt. %, or greater than or equal to exactly or about 0.3 wt. % to less than or equal to exactly or about 0.5 wt. %. For example, in various embodiments the alloy composition of the second metal sheet 13 may comprise Si at a concentration of exactly or about 0.01 wt. %, exactly or about 0.05 wt. %, exactly or about 0.1 wt. %, exactly or about 0.2 wt. %, exactly or about 0.3 wt. %, exactly or about 0.4 wt. %, exactly or about 0.5 wt. %, exactly or about 0.6 wt. %, exactly or about 0.7 wt. %, or exactly or about 0.8 wt. %.

The alloy composition of the second metal sheet 13 may also comprise at least one of Niobium (Nb), vanadium (V), and/or titanium (Ti). The alloy composition of the second metal sheet 13 may comprise a combination including at least one of Nb, V, and Ti, at a concentration of greater than or equal to exactly or about 0.01 wt. % to less than or equal to exactly or about 0.1 wt. %, greater than or equal to exactly or about 0.05 wt. % to less than or equal to exactly or about 0.1 wt. %, or greater than or equal to exactly or about 0.01 wt. % to less than or equal to exactly or about 0.5 wt. %. For example, in various embodiments the alloy composition of the second metal sheet 13 may comprise a combination including at least one of Nb, V, and Ti at a concentration of exactly or about 0.01 wt. %, exactly or about 0.02 wt. %, exactly or about 0.03 wt. %, exactly or about 0.04 wt. %, exactly or about 0.05 wt. %, exactly or about 0.06 wt. %, exactly or about 0.07 wt. %, exactly or about 0.08 wt. %, exactly or about 0.09 wt. %, or exactly or about 0.01 wt. %.

The alloy composition of the second metal sheet 13 may also comprise carbon (C) at a concentration of greater than or equal to exactly or about 0.01 wt. % to less than or equal to exactly or about 0.15 wt. %, greater than or equal to exactly or about 0.01 wt. % to less than or equal to exactly or about 0.10 wt. %, or greater than or equal to exactly or about 0.10 wt. % to less than or equal to exactly or about 0.15 wt. %. For example, in various embodiments the alloy composition of the second metal sheet 13 may comprise C at a concentration of exactly or about 0.01 wt. %, exactly or about 0.05 wt. %, exactly or about 0.1 wt. %, or exactly or about 0.15 wt. %.

The alloy composition of the second metal sheet 13 may include manganese (Mn) at a concentration of greater than or equal to exactly or about 0.2 wt. % to less than or equal to exactly or about 3 wt. %, greater than or equal to exactly or about 0.25 wt. % to less than or equal to exactly or about 2.5 wt. %, greater than or equal to exactly or about 0.5 wt. % to less than or equal to exactly or about 2 wt. %, greater than or equal to exactly or about 0.75 wt. % to less than or equal to exactly or about 1.5 wt. %, or greater than or equal to exactly or about 1 wt. % to less than or equal to exactly or about 1.5 wt. %. In various embodiments, the alloy composition of the second metal sheet 13 comprises Mn at a concentration of less than or equal to exactly or about 0.5 wt. %, less than or equal to exactly or about 1 wt. %, less than or equal to exactly or about 1.5 wt. %, less than or equal to exactly or about 2 wt. %, less than or equal to exactly or about 2.5 wt. %, or less than or equal to exactly or about 3 wt. %.

A balance of the alloy composition of the second metal sheet 13 is iron. However, the inventive concepts are not limited to the above, for example, other metals may be included, for example, nitrogen, nickel, copper, and the like.

In various embodiments, the second metal sheet 13 may have an applied coating 14. The coating 14 may be applied by dipping, painting, spraying, chemical vapor deposition, physical vapor deposition, and the like. A first coating layer 141 may be formed on a first side 131 of the second metal sheet 13, while a second coating layer 142 may be formed on a second opposite side 132 of the first side 131. The first coating layer 141 and the second coating layer 142 may be corrosion protection coatings. While shown on both the first and second sides 131, 132 of the second metal sheet 13, the first coating layer 141 and the second coating layer 142 may be optionally omitted from either or both sides. In various embodiments, the coating 14 may be on one, two, or more sides of the second metal sheet 13.

In certain aspects, the first coating layer 141 and the second coating layer 142 comprise aluminum-silicon coating or a zinc coating. For example, such aluminum-silicon coatings may be aluminum and silicon, or an alloy of aluminum and silicon, with an Al content higher than or equal to exactly or about 80 wt %. For example, such zinc coatings may be zinc or an alloy of zinc and thus predominantly comprise zinc at greater than or equal to exactly or about 80 wt. %. It should be appreciated, however, that the composition of the first coating layer 141 and the second coating layer 142 is not limited to comprising aluminum-silicon or zinc, but may further include additional elements. When used in reference to the various embodiments, a coating does not include a naturally forming oxide, or the like.

With reference to FIG. 1A, the first metal sheet 12 and second metal sheet 13 may be placed next to each other prior to joining. A first surface or joining face 123 of the first metal sheet 12 may contact a second surface or joining face 133 of the second metal sheet. The first metal sheet 12 may have a greater thickness than the second metal sheet 13. For example, the first metal sheet 12 may be exactly or about 5% thicker than the second metal sheet 13, exactly or about 50% thicker than the second metal sheet 13, exactly or about twice or three times as thick as the second metal sheet 13, or more. One of ordinary skill in the art would recognize that a range of thicknesses may be used.

The second metal sheet 13 may have a coating 14 including a first coating layer 141 on a first surface 131 and a second coating layer 142 on a second side 132. The coating 14 may improve the corrosion resistance of the second metal sheet 13.

The upper and lower coatings 141 and 142 may each have a coating mass of greater than or equal to exactly or about 5 g/m² to less than or equal to exactly or about 130 g/m². For example, the first and second coating layers 141 and 142 may have a coating mass of exactly or about 5 g/m², exactly or about 10 g/m², exactly or about 15 g/m², exactly or about 20 g/m², exactly or about 25 g/m², exactly or about 30 g/m², exactly or about 35 g/m², exactly or about 40 g/m², exactly or about 45 g/m², exactly or about 50 g/m², exactly or about 55 g/m², exactly or about 60 g/m², exactly or about 65 g/m², exactly or about 70 g/m², exactly or about 75 g/m², exactly or about 80 g/m², exactly or about 85 g/m², exactly or about 90 g/m², exactly or about 95 g/m², exactly or about 100 g/m², exactly or about 105 g/m², exactly or about 110 g/m², exactly or about 115 g/m², exactly or about 120 g/m², exactly or about 125 g/m², or exactly or about 130 g/m². In some example embodiments, the coatings may have the same thickness. In some other example embodiments, one coating may be thinner than the other. For example, the upper coating 141 may have a thinner coating than the lower coating 142. The upper coating 141 being thinner than the lower coating 142 may improve a weldability of the component 10, based on the welding occurring at the thinner coating. This may be due to a smaller amount of aluminum in the weld nugget.

Figure 1B:
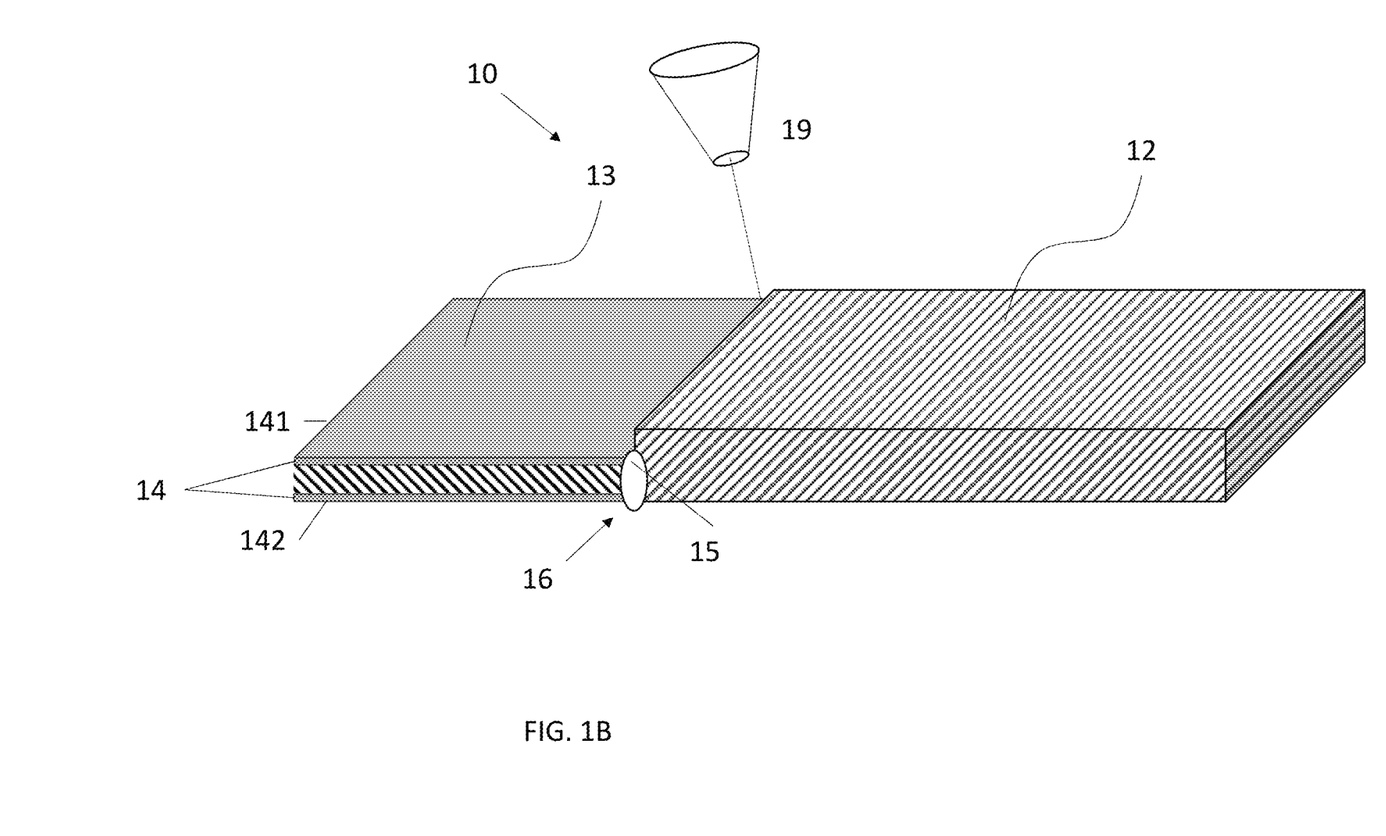

With reference to FIG. 1B, a laser device includes a laser emitter 19 that may join (e.g., weld) the first metal sheet 12 and second metal sheet 13 together, forming a weld nugget 15 along the joining portion 16.

The welding may be ultrasonic welding, direct laser welding, laser welding, or resistance welding. In certain aspects, the welding may be a laser butt welding process, as such processes may increase temperatures and/or melt the metals to create a puddle that can penetrate through any coatings. Generally, the objective is to form a weld nugget that does not decrease the mechanical properties of the component/assembly. The welding could diminish or damage the mechanical properties and corrosion resistance, therefore reducing content that may weaken the weld nugget (e.g., aluminum and/or zinc), is beneficial.

With reference to FIG. 1B, the component 10 may be joined. In various embodiments, the first metal sheet 12 and the second metal sheet 13 may be welded together, forming the weld nugget 15 along the weld line. The weld line may be continuous along the interface of the first metal sheet 12 and the second metal sheet 13, or it may be discontinuous. In various embodiments, the first metal sheet 12 and the second metal sheet 13 may be laser welded together, however, the inventive concepts of the example embodiments are not limited thereto, and one of ordinary skill in the art would recognize other laser welding and welding techniques may be used.

In various example embodiments, the weld nugget 15 may be formed between the first metal sheet 12, the coating 14, and the second metal sheet 13. For example, based on the coating 14 including AlSi, the composition of the nugget 15 may have a higher concentration of aluminum and/or silicon than the compositions of the first and second metal sheets 12, 13. In various example embodiments, based on the coating 14 including Zn, the composition of the nugget 15 may have a higher concentration of zinc than the compositions of the first and second metal sheets 12, 13. In various example embodiments, the first metal sheet 12 is free of any coating, for example, any applied coatings. This may improve the weldability of the first metal sheet 12 and second metal sheet 13 by decreasing the coating content and/or other impurities along the weld nugget. As such, a stronger bond between the first metal sheet 12 and second metal sheet 13 may be formed.

Figure 1C:
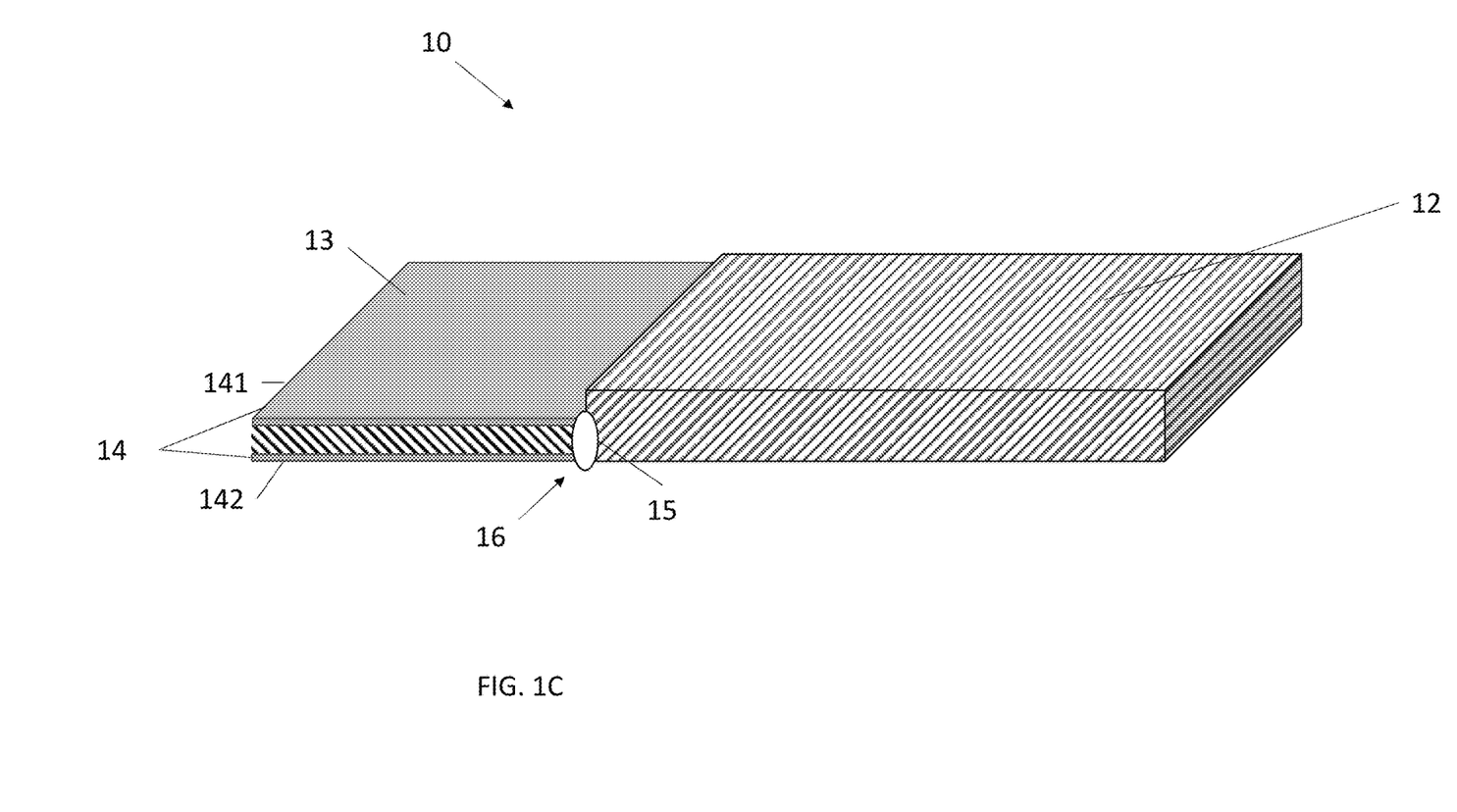

With reference to FIG. 1C, the component 10 may be hot formed.

In various embodiments, the first metal sheet 12 after hot forming may have an ultimate tensile strength (UTS) of greater than or equal to exactly or about 1300 MPa, such as a UTS of exactly or about, exactly or about 1500 MPa, exactly or about 1550 MPa, exactly or about 1600 MPa, exactly or about 1650 MPa, exactly or about 1700 MPa, exactly or about 1750 MPa, exactly or about 1800 MPa, exactly or about 1900 MPa, exactly or about 2000 MPa or greater. Also, the hardened steel made from the alloy composition has a ductility (elongation) of greater than or equal to exactly or about 4% (elongation) to less than or equal to exactly or about 10% (elongation), such as a ductility of exactly or about 4% (elongation), exactly or about 5% (elongation), exactly or about 6% (elongation), exactly or about 7% (elongation), exactly or about 8% (elongation), exactly or about 9% (elongation), or exactly or about 10% (elongation) in the hardened condition.

In various embodiments, the first metal sheet 12 may have a microstructure that includes martensite and austenite.

In various embodiments, the second metal sheet 13 after hot forming may have an ultimate tensile strength (UTS) of greater than or equal to exactly or about 400 MPa, such as a UTS of exactly or about, exactly or about 400 MPa, exactly or about 450 MPa, exactly or about 500 MPa, exactly or about 550 MPa, exactly or about 600 MPa, exactly or about 650 MPa, exactly or about 700 MPa, exactly or about 750 MPa, exactly or about 800 MPa, exactly or about 850 MPa, exactly or about 900 MPa, exactly or about 950 MPa, exactly or about 1000 MPa, exactly or about 1050 MPa, exactly or about 1100 MPa, exactly or about 1150 MPa, exactly or about 1200 MPa, or greater.

In various embodiments, the second metal sheet 13 may have a microstructure that includes martensite.

In various example embodiments, the weld nugget 15 may have a microstructure including martensite, austenite and ferrite, and may be different from that of the first and second metal sheets 12, 13. The weld nugget 15 may include less than or equal to exactly or about 10 vol. % of austenite. For example, the nugget may include exactly or about 0.1 vol. % of austenite, exactly or about 1 vol. % of austenite, exactly or about 2 vol. % of austenite, exactly or about 3 vol. % of austenite, exactly or about 4 vol. % of austenite, exactly or about 5 vol. % of austenite, exactly or about 6 vol. % of austenite, exactly or about 7 vol. % of austenite, exactly or about 8 vol. % of austenite, exactly or about 9 vol. % of austenite, or exactly or about 10 vol. % of austenite. In some example embodiments, the nugget 15 is substantially free of austenite. As used herein, "substantially free" refers to trace component levels, such as levels of less than or equal to exactly or about 0.05%, or levels that are not detectable.

In various example embodiments, the weld nugget may also include less than or equal to exactly or about 15 vol. % of delta ferrite. For example, the nugget may include exactly or about 0.1 vol. % of delta ferrite, exactly or about 1 vol. % of delta ferrite, exactly or about 2 vol. % of delta ferrite, exactly or about 3 vol. % of delta ferrite, exactly or about 4 vol. % of delta ferrite, exactly or about 5 vol. % of delta ferrite. In some example embodiments, the nugget 15 is substantially free of delta ferrite. As used herein, "substantially free" refers to trace component levels, such as levels of less than or equal to exactly or about 0.05%, or levels that are not detectable.

Figure 1D:
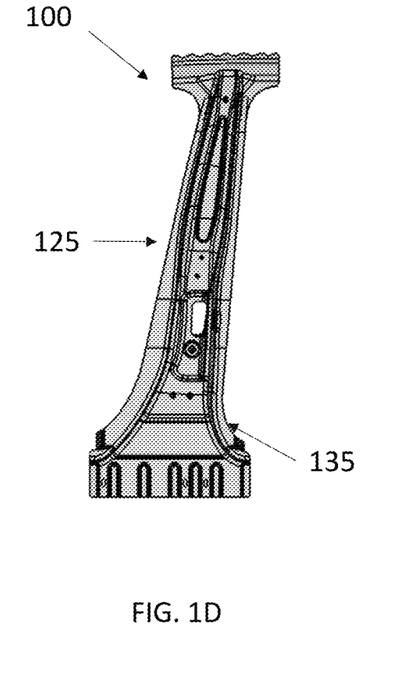

With reference to FIG. 1D, the component 100 including the first metal sheet 12 and the second metal sheet 13 may be formed into a shaped steel object of a structural assembly of a vehicle. The lower portion 135 may include the second metal sheet 13, with an ultimate tensile strength (UTS) of between exactly or about 400 MPa and 1200 MPa with excellent corrosion resistance properties. The upper portion 125 may include the second metal sheet 12, with a UTS of between exactly or about 1300 MPa and exactly or about 2000 MPa.

Figure 2:
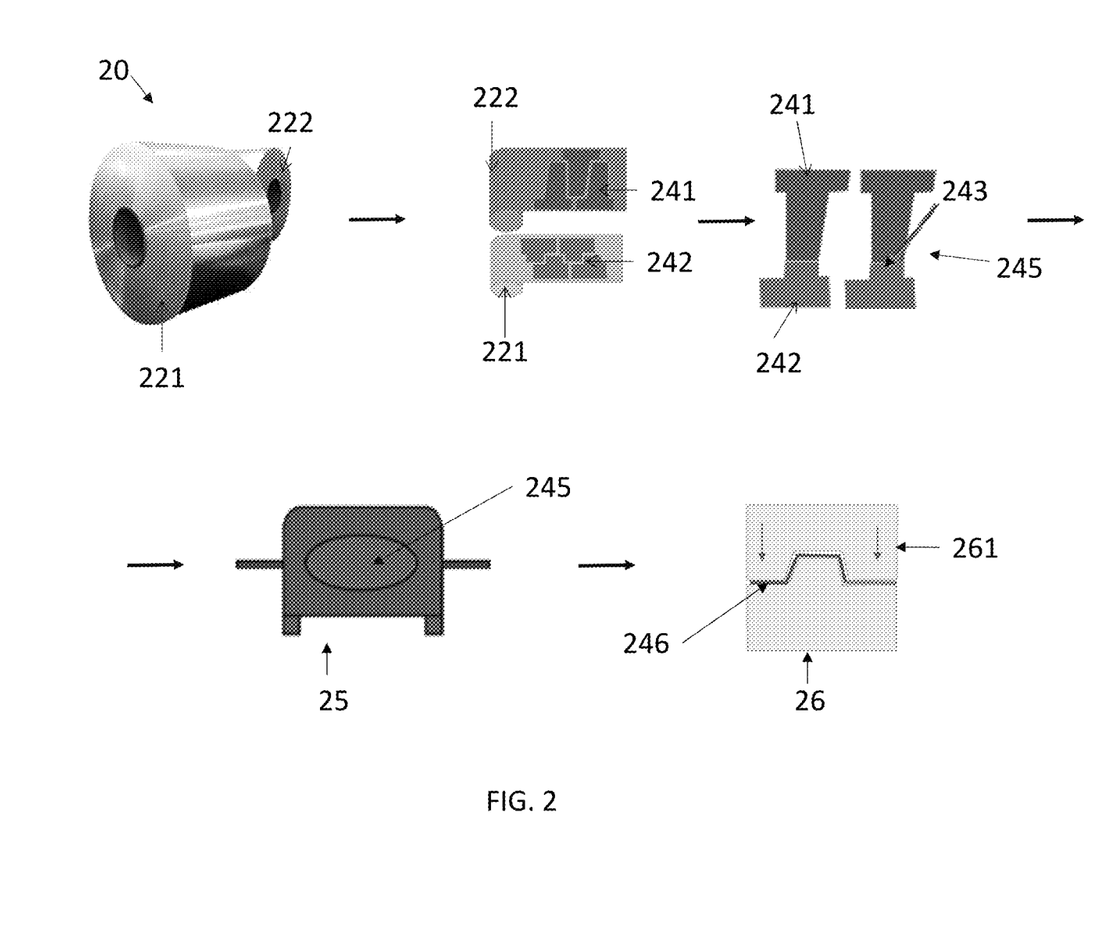
FIG. 2 is a method of producing a part with a tailor welded blank according to various aspects of the present disclosure.

FIG. 2 is a method of producing a tailor welded blank according to various aspects of the present disclosure. Referring to FIG. 2, a method of forming a shaped steel object according to various aspects of the present disclosure is provided. The shaped steel object can be any object that is generally made by hot stamping, such as, for example, a vehicle part. Non-limiting examples of vehicles that have parts suitable to be produced by the current method include bicycles, automobiles, motorcycles, boats, tractors, buses, mobile homes, campers, gliders, airplanes, and tanks.

The method 20 comprises obtaining a first coil 221 of a metal material, and a second coil 222 of a metal material. The first coil 221 is formed of a metal composition distinct from a metal composition of the second coil 222. A first blank 241 may be cut from the first coil 221 (e.g., corresponding to the first metal sheet 12 above), and a second blank 242 may likewise be cut from the second coil 222 (e.g., corresponding to the second metal sheet 13 above). The first coil 221 may be free of any applied coatings.

In various embodiments, the method 20 does not include removing a coating from the first metal sheet 12, at least because the first metal sheet 12 does not include a coating. For example, no ablation, or laser ablation may be performed on the first metal sheet 12 or second metal sheet 13. Thus, the method 20 omits or is free of any ablation or other coating removal processes.

The method 20 also comprises joining the first blank 241 to the second blank 242, for example by welding, or laser welding along a weld line 243, the first blank 241 to the second blank 242 to form a tailor welded blank 245 assembly. This may be done without additional processing, for example, the first blank 241 may not undergo ablation, or laser ablation. In various embodiments, the first blank 241 has no coating and no steps are used to remove a coating from the first blank 241. In various embodiments, the second blank 242 may have a coating, for example coating 14 previously shown in FIGS. 1A-1D, but not shown in FIG. 2.

In various embodiments, the laser welding is performed in an inert atmosphere, for example, comprising nitrogen ($N_2$) gas environment, an argon (Ar) environment, or combinations thereof. The inert atmosphere may be substantially free of oxygen ($O_2$). An environment substantially free of oxygen may prevent or reduce the oxidation of the first and second blanks 241, 242.

The method 20 also comprises an operation 25, during which the tailor welded blank 245 undergoes austenitization by heating the tailor welded blank 245 in a furnace 26 to a temperature above its $A_{c3}$ temperature to form a heated blank comprising austenite and martensite. By way of example, optionally by a robotic arm (not illustrated), the heated blank is transferred to a press 261.

Here, the method 20 comprises an operation 26, during which the heated tailor welded blank 245 is stamped into a predetermined shape to form a stamped object, and quenching the stamped object to form a shaped steel object 246, wherein the shaped steel object 246 comprises material from the first metal sheet 12 and the second metal sheet 13. The method 20 may be free, individually or together, of a pre-oxidation step, of a coating step, and/or of a descaling step (e.g., shot blasting).

In various embodiment, the quenching is performed traditionally by cooling the shaped object at a rate described above until the stamped object reaches a temperature below a temperature at which martensite formation finishes during cooling ($M_f$) temperature of the alloy composition. Here, the shaped steel object 246 may have a microstructure including at least one of martensite and austenite.

In another embodiment, the quenching comprises a quench and partitioning process as described above. Here, the method comprises decreasing the temperature of the shaped steel object 246 until the shaped steel object 246 has a temperature between a temperature at which martensite formation begins during cooling ($M_s$) temperature of the alloy composition and a $M_f$ temperature of the alloy composition, incubating the stamped object at a partitioning temperature wherein carbon (C) is partitioned from martensite into austenite, and then decreasing $M_f$ temperature below room temperature. The partitioning temperature can be the temperature between the $M_s$ and $M_f$ temperatures at which the cooling is stopped, a temperature higher than the temperature between the $M_s$ and $M_f$ temperatures at which the cooling is stopped, or a temperature lower than the temperature between the $M_s$ and $M_f$ temperatures at which the cooling is stopped. Partitioning is performed at the partitioning temperature for a time of greater than or equal to exactly or about 0.01 min to less than or equal to exactly or about 20 min. After the quench and partitioning process, the shaped steel object 246 has a microstructure comprising martensite and austenite. Due to the high Si content of the alloy composition, the microstructure of the shaped steel object 246 may be substantially free of cementite. As used herein, "substantially free" refers to less than or equal to exactly or about 10 vol. %, less than or equal to exactly or about 5 vol. %, or less than or equal to exactly or about 1 vol. %.

Figure 3:
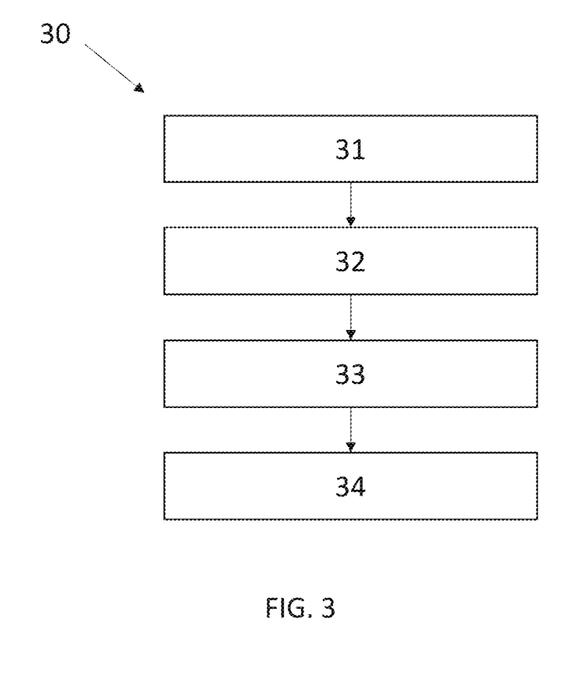
FIG. 3 is a method of producing a tailor welded blank according to various aspects of the present disclosure.

FIG. 3 is a method of producing a tailor welded blank according to various aspects of the present disclosure. Referring to FIG. 3, a method 30 according to various aspects of the present disclosure is provided. The joining the first blank 241 and second blank 242 may further include method 30.

The method 30 may include a laser attunement and irradiation 31, in which, a laser beam being directed at, and impinging, the top surface of the first and second sheets 12, 13 at the weld site at an angle of incidence. The angle of incidence is the angle that the longitudinal beam axis of the laser beam deviates from a linear direction normal to the top surface at the weld site.

The method 30 may further include a weld pooling 32, in which, the irradiance of the laser beam creates a molten metal (e.g., steel and/or other components) weld pool that penetrates into both the first and second sheets 12, 13. The molten steel weld pool may penetrate partially through the first and second sheets 12, 13, or it may fully penetrate the first and second sheets 12, 13.

The method 30 may further include a growth of the weld pooling 33, in which the irradiance of the laser beam is increased to an elevated level to grow the weld pool and cause it to penetrate further into the workpiece first and second sheets 12, 13 towards the bottom surfaces 121 and 131.

The method 30 may further include a laser shutdown 33, once the molten weld pool has been fully grown and penetrates the first and second sheet 12, 13 as desired, the transmission of the laser beam is ceased at the weld site.

The method 30 may further include a weld pool solidification 34, in which the molten weld pool cools and solidifies into the laser weld joint, which is comprised of resolidified composite steel material derived from each of the first and second sheets 12, 13, and the coating 14. The resolidified composite steel material of the laser weld joint intersects the joining faces 123 and 133 of the first and second sheets 12, 13, and autogenously fusion welds the first and second sheets 12, 13, together at the weld site.

In various embodiments, a tailor welded blank 245 may have a desired mechanical strength along a top portion, including the formed blank 241, to protect a passenger of a vehicle (e.g., sufficient strength and rigidity), a desired mechanical strength along a bottom portion, including the formed blank 242, to protect a passenger of a vehicle (e.g., sufficient toughness/ductility to absorb energy and sufficient strength and rigidity for use), as well as sufficient corrosion resistance along the bottom portion. As sufficient corrosion resistance may be reduced or prevented oxidation during use, particularity when exposed to salts. For example, meeting a minimum stone impact rating of 8 during a stone chip resistance test, or 4 millimeter creep-back rating under a scribing and salt spray cycle (e.g., 26 cycles).

Figure 4:
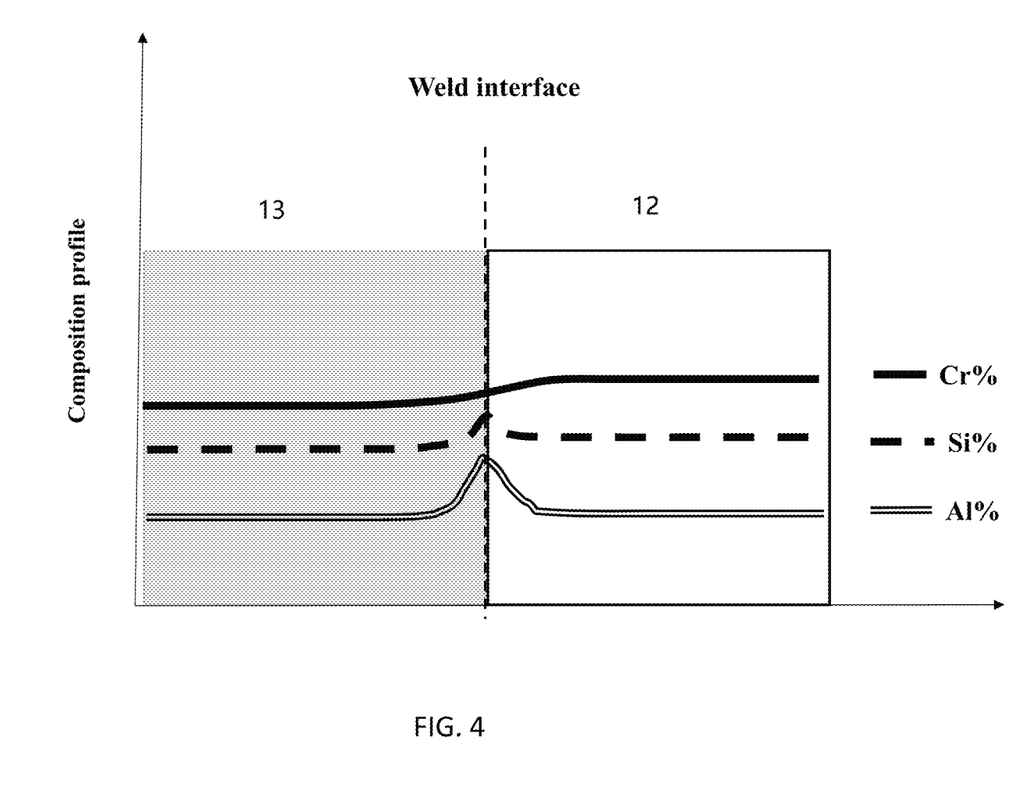
FIG. 4 is an illustration of a composition profile of a tailor welded blank at a weld interface according to various aspects of the present disclosure.

FIG. 4 is an illustration of a composition profile of a tailor welded blank at a weld interface according to various aspects of the present disclosure. Referring to FIG. 4, an illustration of the composition profile of the weld interface is shown according to various aspects of the present disclosure is provided. The first metal sheet 12 may have a composition profile as discussed above, and the second metal sheet 13 may have a composition profile containing Cr, Si, and/or Al. At the weld interface 31 of the first metal sheet 12 and the second metal sheet 13, a nugget 15 may form, as discussed above. The nugget 15 at the weld interface 31 may contain elevated levels of Si and Al due to the presence of the coating 14 (not shown here). For example, the nugget 15 may have less than or equal to exactly or about 1.5 wt. % aluminum, 1.4 wt. % of aluminum, 1.3 wt. % of aluminum, 1.2 wt. % of aluminum, 1.1 wt. % of aluminum, 1.0 wt. % of aluminum, 0.9 wt. % of aluminum, 0.8 wt. % of aluminum, exactly or about 0.7 wt. % of aluminum, exactly or about 0.6 wt. % of aluminum, exactly or about 0.5 wt. % of aluminum, exactly or about 0.4 wt. % of aluminum, exactly or about 0.3 wt. % of aluminum, exactly or about 0.2 wt. % of aluminum, exactly or about 0.1 wt. % of aluminum, or less.

In various embodiments, when the aluminum content is greater than exactly or about 1.5 wt. % of aluminum in the nugget 15, the mechanical properties of the nugget 15 and component 10 may be unsatisfactory at least due to possible separation and/or deformation at the joining portion 16. By using a metal sheet 12 that meets the required mechanical strengths and corrosion resistances without a coating, it is possible to reduce an aluminum content in the nugget to equal to or under exactly or about 1.5 wt. %.

In various embodiments, the weld nugget 15 and joining portion 16 may have UTS greater than or equal to that of the second metal sheet 13 after hot forming. For example, the weld nugget 15 and joining portion 16 may have a UTS of greater than or equal to exactly or about 400 MPa, such as a UTS of exactly or about, exactly or about 400 MPa, exactly or about 450 MPa, exactly or about 500 MPa, exactly or about 550 MPa, exactly or about 600 MPa, exactly or about 650 MPa, exactly or about 700 MPa, exactly or about 750 MPa, exactly or about 800 MPa, exactly or about 850 MPa, exactly or about 900 MPa, exactly or about 950 MPa, exactly or about 1000 MPa, exactly or about 1050 MPa, exactly or about 1100 MPa, exactly or about 1150 MPa, exactly or about 1200 MPa, or greater, based on the UTS of the second metal sheet 13 after hot forming.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A hot formed joined blank comprising:
   a first metal blank having an ultimate tensile strength of greater than or equal to about 1300 MPa to less than or equal to about 2000 MPa and defining a first surface;
   a second metal blank having an ultimate tensile strength of greater than or equal to about 400 MPa to less than or equal to about 1200 MPa and defining a second coated surface having a coating disposed thereon, wherein the coating comprises aluminum and silicon, and a third surface of the second metal blank is joined to the first surface of the first metal blank to form the hot formed joined blank; and
   a weld nugget disposed along a boundary between the first and second metal blanks that is configured to join the first metal blank, the second metal blank, and the coating of the second metal blank, the weld nugget comprising less than or equal to about 1.5 weight percent aluminum.

2. The hot formed joined blank of claim 1, wherein the weld nugget includes a microstructure comprising less than or equal to about 10 vol. % of austenite and less than or equal to about 15 vol. % of delta-ferrite.

3. The hot formed joined blank of claim 1, wherein
   the first metal blank has an ultimate tensile strength of greater than or equal to about 1700 MPa and comprises martensite and austenite, and
   the second metal blank has an ultimate tensile strength of greater than or equal to about 1000 MPa and comprises martensite.

4. The hot formed joined blank of claim 1, wherein the first metal blank comprises an alloy composition comprising:
   chromium (Cr) at a concentration of greater than or equal to about 0.5 wt. % to less than or equal to about 6 wt. %;
   carbon (C) at a concentration of greater than or equal to about 0.15 wt. % to less than or equal to about 0.5 wt. %;
   manganese (Mn) at a concentration of greater than or equal to about 0 wt. % to less than or equal to about 3 wt. %;
   silicon (Si) at a concentration of greater than or equal to about 0.5 wt. % to less than or equal to about 2 wt. %;
   nitrogen (N) at a concentration of greater than or equal to about 0 wt. % to less than or equal to about 0.01 wt. %;
   nickel (Ni) at a concentration of greater than or equal to about 0 wt. % to less than or equal to about 5.0 wt. %;
   copper (Cu) at a concentration of greater than or equal to about 0 wt. % to less than or equal to about 5.0 wt. %;
   molybdenum (Mo) at a concentration of greater than or equal to about 0 wt. % to less than or equal to about 5.0 wt. %;
   vanadium (V) at a concentration of greater than or equal to about 0 wt. % to less than or equal to about 1.0 wt. %;
   niobium (Nb) at a concentration of greater than or equal to about 0 wt. % to less than or equal to about 0.1 wt. %; and
   a balance of the alloy composition being iron.

5. The hot formed joined blank of claim 1, wherein the first metal blank is free of a coating.

6. The hot formed joined blank of claim 1, wherein the first metal blank and the second metal blank are laser butt welded together.

7. A method of forming an assembly of steel parts, the method comprising;
   welding a first end face of a first blank, the first blank having an ultimate tensile strength of greater than or equal to about 1300 MPa to less than or equal to about 2000 MPa, to a second end face of a second blank, the second blank having an ultimate tensile strength of greater than or equal to about 400 MPa to less than or equal to about 1200 MPa, to form a blank assembly, the first blank being free of any coating, the second blank having a coating comprising aluminum and silicon along a side face adjacent the second end face, and forming a weld nugget along an interface of the first end face, the second end face, and the coating along the side face; and
   hot forming the blank assembly so as to form austenite, wherein the weld nugget comprises less than or equal to about 1.5 weight percent aluminum and austenite, the vol. % of austenite being less than or equal to about 10 vol. %.

8. The method of forming an assembly of steel parts of claim 7, the method further comprising;
   cutting the first blank from a first metal coil; and
   cutting the second blank from a second metal coil.

9. The method of claim 7, wherein the joining is laser welding performed in an inert environment comprising argon (Ar) or nitrogen ($N_2$) or combinations thereof.

10. The method of claim 7, further including:
    stamping the blank assembly into a formed press-hardened steel component.

11. A hot formed joined blank comprising:
    a first metal blank having an ultimate tensile strength of greater than or equal to about 1300 MPa to less than or equal to about 2000 MPa and defining a first surface;
    a second metal blank having an ultimate tensile strength of greater than or equal to about 400 MPa to less than or equal to about 1200 MPa and defining a second coated surface having a coating disposed thereon, wherein the coating comprises aluminum and silicon, and a third surface of the second metal blank is joined to the first surface of the first metal blank to form the hot formed joined blank; and
    a weld nugget disposed along a boundary between the first and second metal blanks that is configured to join the first and second metal blanks, the weld nugget comprising less than or equal to about 1.5 weight percent aluminum, wherein the weld nugget includes a microstructure comprising less than or equal to about 10 vol. % of austenite and less than or equal to about 15 vol. % of delta-ferrite.

* * * * *